(12) United States Patent
Berg et al.

(10) Patent No.: US 8,731,185 B2
(45) Date of Patent: May 20, 2014

(54) SINGLE ENDED ESTIMATION OF FAR-END CROSSTALK IN A DIGITAL SUBSCRIBER LINE

(75) Inventors: Miguel Berg, Upplands Väsby (SE); Daniel Cederholm, Solna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/505,285

(22) PCT Filed: Dec. 17, 2009

(86) PCT No.: PCT/SE2009/051445
§ 371 (c)(1),
(2), (4) Date: Apr. 30, 2012

(87) PCT Pub. No.: WO2011/053207
PCT Pub. Date: May 5, 2011

(65) Prior Publication Data
US 2012/0219123 A1   Aug. 30, 2012

Related U.S. Application Data

(60) Provisional application No. 61/256,395, filed on Oct. 30, 2009.

(51) Int. Cl.
*H04M 1/24* (2006.01)
*H04M 3/08* (2006.01)
*H04M 3/22* (2006.01)
*H04M 1/76* (2006.01)
*H04M 7/00* (2006.01)
*H04M 9/00* (2006.01)

(52) U.S. Cl.
USPC ......... 379/417; 379/1.03; 379/1.04; 375/222; 375/254; 375/285; 370/201; 370/252

(58) Field of Classification Search
USPC .......... 379/1.01, 1.04, 3, 9, 22.08, 24, 27.01, 379/406.01, 406.12, 1.03, 416, 417; 375/222, 254, 285; 370/201, 252
See application file for complete search history.

(56) References Cited

U.S. PATENT DOCUMENTS 6,292,559 B1 * 9/2001 Gaikwad et al. .............. 379/417
(Continued)

FOREIGN PATENT DOCUMENTS

EP    1995885 A1   11/2008
(Continued)

OTHER PUBLICATIONS

International Search Report, Application No. PCT/SE2009/051445, dated Aug. 9, 2010, 2 pages.

*Primary Examiner* — Binh Tieu
(74) *Attorney, Agent, or Firm* — Blakely Sokoloff Taylor & Zafman, LLP

(57) ABSTRACT

An apparatus for estimating far-end crosstalk $R_{DS\text{-}FEXT, i}(f_d)$ or an end ($C_1$-2) of a communication line (C1) furthest from a transceiver (10-1) to which the communication line ($C_1$) is connected. The apparatus is configured to: measure upstream noise $R_{US\text{-}Noise}(f_u)$ at an upstream frequency ($f_u$), the up¬ stream noise $R_{US\text{-}Noise}(f_u)$ induced in the communication line (C1) due to the crosstalk; select a downstream frequency (fd) for which the far-end crosstalk $R_{DS\text{-}FEXT, i}(f_d)$ is to determined; and estimate the far-end crosstalk $R_{DS\text{-}FEXT, i}(f_d)'$ as a function of the upstream Noise $R_{US\text{-}Noise}(f_u)$, the up¬ stream frequency ($f_u$) and the downstream frequency ($f_d$). An apparatus reversing upstream and downstream features, a system, a computer readable medium and related methods are also described.

21 Claims, 4 Drawing Sheets

(56) References Cited

U.S. PATENT DOCUMENTS

| | | |
|---|---|---|
| 7,154,841 B2 * | 12/2006 | Sakaue et al. ............... 369/275.2 |
| 7,154,845 B1 * | 12/2006 | Barrass et al. ................. 370/201 |
| 8,204,211 B2 * | 6/2012 | Mahadevan et al. ........... 379/417 |
| 8,270,311 B2 * | 9/2012 | Lindqvist et al. .............. 370/252 |
| 8,369,205 B2 * | 2/2013 | Stolle et al. .................... 370/201 |
| 2003/0099350 A1 * | 5/2003 | Bostoen et al. ................ 379/417 |
| 2005/0057880 A1 | 3/2005 | Bailey et al. |
| 2008/0151742 A1 | 6/2008 | Stolle et al. |
| 2009/0092036 A1 | 4/2009 | Peeters et al. |
| 2010/0208785 A1 * | 8/2010 | Lindqvist et al. .............. 375/227 |
| 2010/0254467 A1 * | 10/2010 | Braun et al. ................... 375/260 |
| 2010/0278328 A1 * | 11/2010 | Mahadevan et al. ...... 379/406.06 |
| 2011/0142111 A1 * | 6/2011 | Sands et al. .................... 375/222 |
| 2011/0206101 A1 * | 8/2011 | Matza et al. .................... 375/222 |
| 2012/0020277 A1 * | 1/2012 | Kanellakopoulos et al. . 370/315 |
| 2013/0170629 A1 * | 7/2013 | Flowers et al. ................... 379/23 |

FOREIGN PATENT DOCUMENTS

| | | |
|---|---|---|
| EP | 1998465 A1 | 12/2008 |
| WO | 2005114861 A1 | 12/2005 |
| WO | 2008008015 A2 | 1/2008 |
| WO | 2008030145 A1 | 3/2008 |

* cited by examiner

SINGLE ENDED ESTIMATION OF FAR-END CROSSTALK IN A DIGITAL SUBSCRIBER LINE

CROSS-REFERENCE TO RELATED APPLICATIONS

This application is a National stage of International Application No. PCT/SE2009/051445, filed Dec. 17, 2009, which claims priority to U.S. Patent Application No. 61/256,395, filed Oct. 30, 2009, which are hereby incorporated by reference.

TECHNICAL FIELD

The invention relates to single ended estimation of far-end crosstalk in a telecommunication line using digital subscriber line technology.

BACKGROUND ART

When telecom operators sell digital subscriber line (DSL) services for data transmission over a telecommunication line (or just "line" or "loop") to a customer, it is often a problem that telecommunication line properties that affect DSL services are not sufficiently well known. Because of that, it may not be possible to accurately predict how much line capacity, such as a data transfer rate given in Mbits/second, the line can support and hence which capacity that can be sold to the customer.

An operator end of the line includes a Central Office (CO) at which a DSL Access Multiplexer (DSLAM) is typically located while a customer end of the line includes a customer premises (CP) at which a Customer Premises Equipment (CPE) is typically located. Other examples where a DSLAM can be located includes locations beyond the CO, such as an equipment cabinet or a space in a basement of an office building. The DSL service is set up between the CO and the CP where a downstream transmission refers to CO to CP (or DSLAM to CPE) transmission while upstream transmission refers to CP to CO (or CPE to DSLAM) transmission. The DSL Access Multiplexer in the CO is used for data transmission but can also be used for determining line properties such as attenuation which in combination with knowledge about transmitter power spectral density and noise power spectral density can be used for estimating line capacity.

When determining downstream line capacity accurately in a DSL system, the so called far-end noise must be known, i.e. in this case the noise that would be experienced by a CPE connected to the line. In noise-limited systems, far-end noise can be approximated by knowing the receiver noise (noise at the CPE) or similar prior knowledge. For example, a value of −140 dBm/Hz is often used when assuming far-end noise for a DSL CPE. However, in reality many lines for DSL communication are limited by crosstalk (interference) from adjacent lines.

The crosstalk typically comprises Far End Crosstalk (FEXT) and Near End Crosstalk (NEXT), where FEXT is interference between two adjacent lines, as measured at the end of the line furthest from the transmitter, and NEXT is interference between adjacent lines, as measured at the end of the line nearest to the transmitter. Since a transmitter or transceiver is arranged in each of the DSLAM and CPE, a respective NEXT and FEXT can be determined for each of the DSLAM and the CPE. Since most DSL technologies separate frequency bands for upstream and downstream communication, NEXT is usually not a problem while FEXT is a major cause of line capacity limitation.

Accordingly, determining the FEXT is important when assessing the line capacity of a DSL line, and various techniques for determining FEXT exist, such as i) double-ended line test methods that measure noise at both sides, i.e. both upstream FEXT at the DSLAM and downstream FEXT at the CPE, ii) estimation methods for determining downstream FEXT from DSLAM NEXT, iii) methods for interpolation/extrapolation of measured FEXT couplings to other frequencies and to the opposite transmission direction using reciprocity, iv) methods using extrapolation of measured FEXT level to higher frequencies in the same transmission direction as for the FEXT measurements, v) methods using an average upstream noise level as an estimate of the far-end noise level for all downstream frequencies, and vi) methods employing a 1% worst-case FEXT models, without any input regarding the current noise situation.

More specific examples of techniques relating to determining parameters affecting line capacity can be found in patent documents WO2008/030145, WO2005/114861, US20090092036, US20050057880A1 and WO2008/008015.

The techniques for determining FEXT described above are generally capable of estimating FEXT-values. However, due to various deficiencies the estimated FEXT-values tend to suffer from an inability to accurately reflect a true FEXT-value that may indicate e.g. the true far end noise and/or true line capacity, in particular when no equipment is allocated at the customer premises.

SUMMARY

It is an object of the invention to at least partly overcome one or more of the above-identified limitations of the prior art. In particular, it is an object to provide an apparatus that may estimate a more accurate far-end crosstalk, while still not requiring any interaction with an active user equipment at the customers premises.

Hence an apparatus is provided for estimating far-end crosstalk (FEXT) for an end of a communication line furthest from a transceiver to which the communication line is connected. The apparatus is configured to: measure upstream noise at an upstream frequency, the upstream noise induced in the communication line due to the crosstalk; select a downstream frequency for which the far-end crosstalk is to be determined; and estimate the far-end crosstalk, as a function of the upstream noise, the upstream frequency and the downstream frequency.

Typically, the apparatus can be a hardware component arranged in a central office (CO) of a Digital Subscriber Line (DSL) communication system, but can also be a Digital Subscriber Line Access Multiplexer (DSLAM) that might be arranged in a CO. Typically the apparatus is configured to implement known protocols and standards within the field of DSL technology, and can e.g. include the same physical components as known DSLAM-units. The transceiver can then be a part of the CO or the DSLAM, and can be separated in a transmitter unit and a receiver unit. When relating the estimated FEXT to the DSLAM and in relation to transmission directions in the line, it can be said that the apparatus estimates downstream FEXT.

The apparatus can also be arranged in another remote location such as in a street cabinet. Moreover, the apparatus can be a part of a communication management system that controls equipments in a large number of central offices, where e.g. a DSLAM can be used for measuring the upstream noise.

Typically, a processor unit within the apparatus is configured to perform the measuring, selecting, determining and estimating as well as implementing other features described below. The communication line is typically a conventional cable of a telecommunication network where the far-end as seen from the transceiver of the apparatus, i.e. the end of the communication line furthest from the transceiver, may be connected to a conventional DSL modem.

The measured upstream noise is typically so called quiet line noise, i.e. the transceiver does not send any signal via the line when measuring the noise. Hence, the apparatus may be configured to measure quiet line upstream noise at an upstream frequency, where the upstream noise is induced due to the crosstalk. The apparatus may typically include a receiver for this purpose. In this context, the measurement of noise may be referred to as a near-end measurement.

Measuring of an upstream (or first) frequency can mean that the apparatus selects a certain (upstream) frequency for which the noise shall be measured, where the denotation "upstream" only serves the purpose of differentiating the frequency from other frequencies such as the downstream (or second) frequency.

The apparatus is advantageous in that it can be used to give a good estimate of the FEXT by measurement of near-end noise. As indicated, no CPE is needed at the far end even though one may be installed there. Also, since the apparatus is not necessarily based on measuring NEXT, measurements do not need to be performed in the transmit frequency bands which makes the apparatus feasible when implemented in e.g. an Asymmetric Digital Subscriber Line (ADSL) system where a receiver in the apparatus is typically limited to measure only in upstream receive bands.

The apparatus may be configured to: determine a first relationship on basis on an upstream power spectral density and a downstream power spectral density, as a function of the upstream frequency and the downstream frequency; and estimate the far-end crosstalk as a function of the first relationship.

The first relationship can also be referred to as a power spectral density-relationship where upstream and downstream power spectral densities can be obtained from management data used for the operation of the apparatus, such as from data given by ITU-T G.997.1 as specified by Telecommunication Standardization Union (ITU). In this context, the upstream power spectral density is determined from the management data as a function of the upstream frequency while the downstream power spectral density is determined as a function of the downstream frequency.

The apparatus may be configured to determine the first relationship on basis on a quotient of the downstream power spectral density and the upstream power spectral density.

The apparatus may be configured to determine the upstream power spectral density as a function of a set of upstream power spectral density-values used for upstream signal transmission over communication lines adjacent to the communication line. For example, the upstream power spectral density can be determined as a mean value or any other weighted value of upstream power spectral densities of neighbouring lines which use the same frequency for upstream signal transmission. Obtaining upstream power spectral densities of neighbouring lines can be based on retrieving power spectral density-values from management data used for the operation of the apparatus, such as from ITU-T G.997.1, as described above. By using e.g. a combination of parameters defined in ITU-T G.997.1 and read out via a management interface of the DSLAM, it is possible to calculate the transmit power spectral densities for up- and downstream. For example, in case the apparatus is part of a VDSL2-system, the apparatus may use the Medley Reference PSD (MREFPSD) and parameters related to Upstream/Downstream Power Back Off (UPBO/DPBO). In case the apparatus is part of an ADSL2(+)-system, the so called tssi values may be used.

The apparatus may be configured to determine the downstream power spectral density as a function of a set of downstream power spectral density-values used for downstream signal transmission over communication lines adjacent to the communication line. For example, the downstream power spectral density can be determined as a mean value or any other weighted value of downstream power spectral densities of neighbouring lines which use the same frequency for downstream signal transmission. The downstream power spectral densities of neighbouring lines are typically known by the apparatus or can be communicated to the apparatus, since it is often the apparatus per se or another apparatus located at an operator end that sets the downstream power spectral densities.

Accordingly, the apparatus may be configured to determine each of the upstream power spectral density and the downstream power spectral density as a function of a respective predetermined spectral density-value. For example, the predetermined spectral density value may be obtained from a suitable standard within the field of DSL technologies, e.g. by using a maximum power spectral density-value specified in the standard, by using a fraction such as 50% of the specified maximum power spectral density-value, or a value obtained by subtracting a relatively small, fix value from the specified maximum-value.

The apparatus may be configured to: determine a second relationship on basis of an upstream power transfer function and a downstream power transfer function of the communication line, as a function of the upstream frequency and the downstream frequency; and estimate the far-end crosstalk as a function of the second relationship.

The apparatus may be configured to determine the second relationship on basis of a quotient of the downstream power transfer function and the upstream power transfer function.

The second relationship can also be referred to as a power transfer function-relationship. Determining the second relationship is typically done as a function of the upstream frequency and the downstream frequency, since the downstream power transfer function depends on the downstream frequency while the upstream power transfer function depends on the upstream frequency.

The apparatus may be configured to execute a single-ended line test (SELT) for determining each of the upstream power transfer function and the downstream power transfer function. This implies that no CPE at the far end of the line is required or used for determining the far-end crosstalk. However, it is still possible to use the apparatus even if a CPE is present at the far end. In case SELT would experience trouble in determining the upstream power transfer function and the downstream power transfer function, e.g. in the case when they are not equal, SELT will most likely give the average of g and h The apparatus may be configured to determine each of the upstream power transfer function and the downstream power transfer function on basis of known properties of the communication line. Example of such properties include line length and cable properties that can be derived from e.g. cable types PE04 and PE05 in specification TS 101388 of the European Telecommunications Standards Institute (ETSI). In this context it is to be noted that relatively few types of cables are used in several regions around the world, which gives a possibility to relatively easily obtain the known properties to be used.

Typically each line type then has its own upstream and downstream power transfer function, and an operator of the apparatus can then input the power transfer functions in the apparatus.

The apparatus may be configured to select the upstream frequency as a function of at least one frequency-value used for downstream signal transmission over at least one communication line adjacent the communication line. For example, if a certain frequency-value is used for downstream signal transmission by other lines in the same cable as the line for which the far-end crosstalk is to be estimated, a different upstream frequency may be selected, i.e. the upstream frequency is selected such that it has a frequency-value that is not used for downstream transmission in neighbouring lines. This reduces the risk of having FEXT that is dominated by NEXT. In this context "dominated" may refer to the NEXT being so large at the relevant frequency that it may be hard to accurately determine FEXT. However, the difference between the upstream frequency and downstream frequencies of neighbouring lines does not have to be very large. For example, if a bandplan that defines the frequency range of the transmission frequencies is known, it suffices to select an upstream frequency only one tone away from the downstream band.

The apparatus may be configured to estimate a number of far-end crosstalk values on basis of upstream noise in the communication line measured for a set of different upstream frequency values. From this follows that the apparatus may be configured to measure a number of noise-values at (a same number of) different upstream frequencies, and then to determine FEXT for each pair of noise values and upstream frequency values. This is advantageous in that it facilitates determination of e.g. a weighted average FEXT that more accurately reflects the actual crosstalk in the line.

Hence, the apparatus may be configured to determine an average far-end crosstalk value, as a function of the number of measured upstream noise values.

The apparatus may be configured to determine a far-end noise level, as a function of the estimated far-end crosstalk and a predetermined background noise-level. This may be done by e.g. summarizing the estimated far-end crosstalk and the predetermined background noise-level. The predetermined background noise-level can be a certain value, such as a value that corresponds to noise induced by a CPE per se. Exactly how much noise a specific type of CPE generates can be empirically established, and preferably a noise value of a CPE-type that an operator of the apparatus intends to deliver to the customer is used.

The end of the communication line furthest from the transceiver is preferably not connected to any customer premises equipment that communicates with the apparatus for estimating the far-end crosstalk. This does not exclude the possibility that a CPE is physically connected to the apparatus, but instead indicates that no CPE is actively used or takes an active part in estimating the far-end crosstalk, i.e. any CPE connected to the line is quiet (sends no signal) when the apparatus estimates the far-end crosstalk.

The apparatus may be configured to measure upstream noise by executing a quiet line noise measurement in the communication line, which may mean that no equipment sends any signal over the communication line.

Moreover, the previously described features of the apparatus may also be implemented in a CPE, which would correspond to an implementation as described above but with the difference of changing "downstream" to "upstream" and vice versa, such that the apparatus is the CPE which would then allow an end-user to estimate FEXT as experienced by the DSLAM.

From this follows that, according to another aspect of the invention, an apparatus in form of a CPE is provided, which is capable of estimating far-end crosstalk for an end of a communication line furthest from a transceiver in the CPE to which the communication line is connected. The CPE is configured to: i) measure downstream noise at a downstream frequency, the downstream noise induced in the communication line due to the crosstalk, ii) select an upstream frequency for which the far-end crosstalk is to be determined, and iii) estimate the far-end crosstalk, as a function of the downstream noise, the downstream frequency and the upstream frequency.

The apparatus in form of the CPE may include any of the functionality of the apparatus in the form a DSLAM, by changing "upstream" to "downstream" and vice versa.

According to still another aspect of the invention a system is provided for estimating far-end crosstalk for an end of a communication line furthest from a transceiver to which the communication line is connected. The system is configured to: receive upstream noise measured at an upstream frequency, the upstream noise induced in the communication line due to the crosstalk; select a downstream frequency for which the far-end crosstalk is to be determined; and estimate the far-end crosstalk, as a function of the upstream noise, the upstream frequency and the downstream frequency.

The system is typically an access-node management system that can handle the operation and management of a number of access-nodes in form of e.g. DSLAM units. The measured upstream noise is typically measured by a DSLAM unit that sends the measured noise to the system. Other parameters, such as upstream and downstream frequencies and power spectral density-values can however be selected by the system. Other features (apart from the noise measurement per se) described above in connection with the apparatus can be performed by the system as well.

According to another aspect of the invention a method is provided for estimating far-end crosstalk for an end of a communication line furthest from a transceiver to which the communication line is connected. The method comprises the steps of: measuring upstream noise at an upstream frequency, the upstream noise induced in the communication line due to the crosstalk; selecting a downstream frequency for which the far-end crosstalk is to be determined; and estimating the far-end crosstalk, as a function of the upstream noise, the upstream frequency and the downstream frequency.

The inventive method is typically performed by a DSLAM and may include any of the functionality implemented by the features described above in association with the inventive apparatus and shares the corresponding advantages. For example, the method may include a number of steps corresponding to the above described configuration of the apparatus.

The method can also be performed by the system described above, with the principal difference that the system does not have to perform the noise measurement but can instead receive the measured noise (from e.g. a DSLAM). The method as performed by the system can include corresponding features described in association with the method for the apparatus with the difference, when applicable, that the system can receive measurements from e.g. a DSLAM unit instead of performing the measurements.

More specifically, the method may comprise the steps of: determining a first relationship on basis on an upstream power spectral density and a downstream power spectral density, as a function of the upstream frequency and the downstream frequency; and estimating the far-end crosstalk as a function of the first relationship.

The method may comprise the step of determining the first relationship on basis on a quotient of the downstream power spectral density and the upstream power spectral density.

The method may comprise the step of determining the upstream power spectral density as a function of a set of upstream power spectral density-values used for upstream signal transmission over communication lines adjacent to the communication line.

The method may comprise the step of determining the downstream power spectral density as a function of a set of downstream power spectral density-values used for downstream signal transmission over communication lines adjacent to the communication line.

The method may comprise the step of determining each of the upstream power spectral density and the downstream power spectral density as a function of a respective predetermined spectral density-value.

The method may comprise the steps of: determining a second relationship on basis on an upstream power transfer function and a downstream power transfer function of the communication line, as a function of the upstream frequency and the downstream frequency, and estimating the far-end crosstalk as a function of the second relationship.

The method may comprise the step of determining the second relationship on basis of a quotient of the downstream power transfer function and the upstream power transfer function.

The method may comprise the step of execute a single-ended line test for determining each of the upstream power transfer function and the downstream power transfer function.

The method may comprise the step of determining each of the upstream power transfer function and the downstream power transfer function on basis of known properties of the communication line.

The method may comprise the step of select the upstream frequency as a function of at least one frequency-value used for downstream signal transmission over at least one communication line adjacent the communication line. For example, this may mean that the upstream frequency can be selected to a frequency value not used for downstream signal transmission.

The method may comprise the step of estimate a number of far-end crosstalk values on basis of upstream noise in the communication line measured for a set of different upstream frequency values.

The method may comprise the step of determining an average far-end crosstalk value, as a function of the number of measured upstream noise values.

The method may comprise the step of determining a far-end noise level, as a function of the estimated far-end crosstalk and a predetermined background noise-level.

For the method as for the apparatus, the end of the communication line furthest from the transceiver does not have to be connected to any customer premises equipment that communicates with the apparatus for estimating the far-end crosstalk.

The method may comprise the step of measuring upstream noise by executing a quiet line noise measurement in the communication line.

Also, according to another aspect of the invention, a method performed by the CPE is provided which corresponds to the method that may be performed by the DSLAM. The method performed by the CPE may include any of the functionality of the method performed by the DSLAM, by changing "upstream" to "downstream" and vice versa.

According to still another aspect of the invention, a computer-readable medium is provided, storing processing instructions that, when executed by a processor unit, performs any of the above described methods, including any variations thereof.

Still other objectives, features, aspects and advantages of the invention will appear from the following detailed description, from the attached claims as well as from the drawings.

BRIEF DESCRIPTION OF THE DRAWINGS

Embodiments of the invention will now be described, by way of example, with reference to the accompanying schematic drawings, in which.

DETAILED DESCRIPTION

Figure 1:
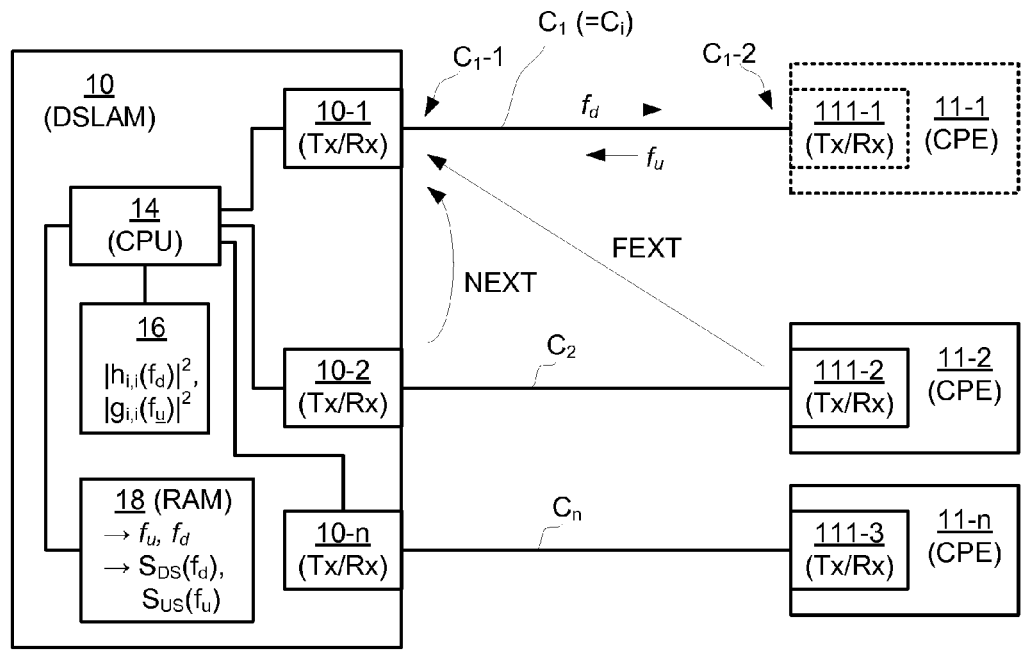
FIG. 1 is a view of an embodiment of an apparatus for estimating far-end crosstalk, as connected to a number of customer premises equipments.

With reference to FIG. 1 an apparatus 10 for estimating far-end crosstalk is illustrated. The apparatus 10 is, for example, a DSLAM which includes or cooperates with n number of transceivers (Tx/Rx) 10-1, 10-2, 10-n. Each of the transceivers 10-1, 10-2, 10-n is connected with a central processing unit (CPU) 14 and is capable of transmitting signal via a respective communication line $C_1$, $C_2$, $C_n$ at a downstream frequency $f_d$. Each transceiver 10-1, 10-2, 10-n can also receive a signal via the respective communication line $C_1$, $C_2$, $C_n$ at an upstream frequency $f_u$.

The apparatus 10 also includes a memory unit (RAM) 18, i.e. a computer-readable medium, that is connected to the processor unit 14 and is used for storing processing instructions that, when executed by the processor unit 14, performs the method described below. The memory unit 18 also includes data about upstream frequencies that may be used for upstream transmission via the communication lines $C_1$, $C_2$, $C_n$ as well as data about which downstream frequencies that may be used for downstream transmission via the communication lines $C_1$, $C_2$, $C_n$.

Moreover, the memory unit 18 also holds information about values for downstream power spectral density $\overline{S}_{DS}(f_d)$ and upstream power spectral density $\overline{S}_{US}(f_u)$ that may be used for transmission via the communication lines $C_1$, $C_2$, $C_n$.

The apparatus 10 has also a power transfer function module 16 for determining a downstream power transfer function $|h_{i,i}(f_d)|^2$ and an upstream power transfer function $|g_{i,i}(f_u)|^2$.

n number of CPEs 11-1, 11-2, 11-n are via communication lines $C_1$, $C_2$, $C_n$ connected to a respective transceiver 10-1, 10-2, 10-n in the apparatus 10. More specifically, each of the CPEs 11-1, 11-2, 11-n has a respective transceiver 111-1, 111-2, 111-n for establishing the connection with the apparatus 10, such that upstream and downstream data transmission (signal exchange) may be realized between the apparatus 10 and the CPEs 11-1, 11-2, 11-n.

The first CPE 11-1 is illustrated with dashed lines since it is not needed when performing the method described below, i.e. in the example below, the apparatus 10 estimates far-end crosstalk $\hat{R}_{DS\_FEXT,i}(f_d)$ for an end $C_1$-2 of a the first communication line $C_1$ that does not have to be connected to a CPE. In fact, in most cases when the described method is used no CPE is connected to the communication line for which far-end crosstalk is to be determined. However, a conventional phone is often connected to the relevant end when the method is performed.

The end $C_1$-2 is a so called far-end of the communication line $C_1$ as seen from the apparatus 10, while the other end $C_1$-1 is the near-end of the communication line $C_1$. Hence, as seen from the apparatus 10, far-end crosstalk $\hat{R}_{DS\_FEXT,i}(f_d)$ can be seen as found at the far-end $C_1$-2 while near-end crosstalk can be seen as found at the near-end $C_1$-1.

The CPEs 11-1, 11-2, 11-n are typically DSL modems which together with the apparatus 10 in the form of a DSLAM are implemented in accordance with a known DSL-standard. This includes e.g. all types of ADSL and VDSL standards, such as the ITU-T G.992.1, G.992.3, G.992.5, G.993.1, G.993.2-standards as well as similar future standards.

Each transceiver 10-1, 10-2, 10-n of the apparatus 10 are implemented such that they can measure so called quite line noise (QLN) over each of the communication lines $C_1$, $C_2$, $C_n$, for example in accordance with the standard ITU-T G.996.2, also known as G.linetest, which describes how the QLN may be measured and reported.

The processor unit 14 can comprise one or more data processors which each performs one or more of the operations of the apparatus 10, and any of the transceivers 10-1, 10-2, 10-n, 111-1, 111-2, 111-n in the apparatus and in the CPEs can comprise a respective transmitter and receiver. Each of the communication lines $C_1$, $C_2$, $C_n$ typically comprises similar structures, e.g. in the form of unshielded, twisted pair of copper wires.

Figure 2:
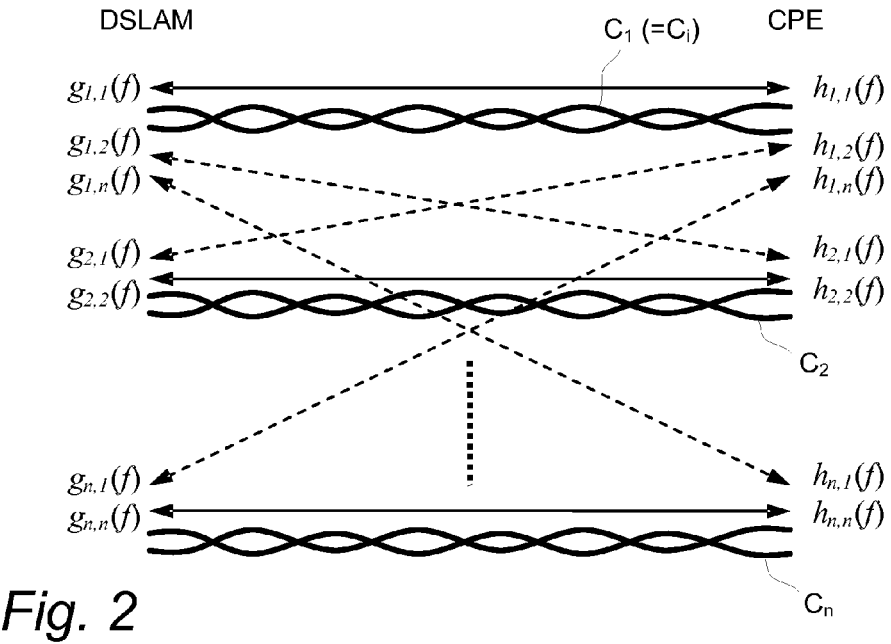
FIG. 2 illustrates direct channels and FEXT couplings between communication lines of the apparatus of FIG. 1, where g denotes upstream and h denotes downstream couplings.

With further reference to FIG. 2, direct channels (communication lines) and FEXT couplings between the communication lines $C_1$, $C_2$, $C_n$ of the apparatus 10 are illustrated, where g denotes upstream and h denotes downstream couplings.

The apparatus 10 can perform a so called Single-Ended Line Test (SELT), which typically can include two types of measurements, where the first type is an echo measurement that can be used to e.g. estimate the communication line length and cable transfer function. Estimation of such parameters may be performed by using methods known within the field of DSL technology. The apparatus 10 can also perform a Quiet Line Noise (QLN) measurement, which measures the received signal (noise) at the near end $C_1$-1 when any transmitters (or transmitter part of a transceiver) connected to the line is silent. As described below, the apparatus 10 can estimate FEXT for e.g. line $C_1$, which in the example also is referred to as line $C_i$, by performing a near-end QLN measurement. In the following text, the terms "loop", "pair" and "line" may be used interchangeably and corresponds to the communication lines of FIG. 1.

Quiet Line Noise (QLN) is the total received noise as measured by the transceiver (or receiver part of the transceiver) in the apparatus 10 when the transmitters at both ends of the particular line $C_i$ (exemplified by line $C_1$) are silent. QLN is commonly given in dBm/Hz unit, i.e. dB relative to 1 mW per Hz, and the QLN per frequency in downstream (DS) and upstream (US) is denoted $QLN_{DS}(f_d)$ and $QLN_{US}(f_u)$ respectively, where, as mentioned, $f_d$ denotes the transmission frequency for downstream communication while $f_u$ denotes the transmission frequency for upstream communication. QLN typically consists of FEXT, NEXT, and background noise. Background noise includes both thermal noise in the receiver and other noise sources (from electrical and electronic equipment).

The total received noise PSD for line i (line $C_i/C_1$) is $$R_{DS\_Noise,i}(f_d)[W/Hz] = R_{DS\_FEXT,i}(f_d) + R_{DS\_NEXT,i}(f_d) + N_{DS,i}(f_d)$$

$$R_{US\_Noise,i}(f_u)[W/Hz] = R_{US\_FEXT,i}(f_u) + R_{US\_NEXT,i}(f_u) + N_{US,i}(f_u) \quad (1)$$

where the three terms on the right hand side correspond to received FEXT, NEXT, and background noise powers respectively. In this example FEXT is estimated for the communication line C1 which means that line i can be read as line 1, i.e. =1. Thus, QLN (in dBm/Hz) per frequency f for line i can be written as:

$$QLN_{DS,i}(f_d)[dBm/Hz] = 10 \cdot \log_{10}\left(\frac{R_{DS\_Noise,i}(f_d)}{10^{-3}}\right) \quad (2)$$

$$QLN_{US,i}(f_u)[dBm/Hz] = 10 \cdot \log_{10}\left(\frac{R_{US\_Noise,i}(f_u)}{10^{-3}}\right)$$

The received crosstalk signal in line i from a signal transmitted in line j (where, using the described example, j= {2, ..., n}) can be expressed as the transmitted signal PSD multiplied by the crosstalk power transfer function:

$$R_{i,j}(f) = S_j(f) \cdot |h_{i,j}(f)|^2 \quad (3)$$

where $R_{i,j}(f)$ is the received PSD, $S_j(f)$ is the transmit PSD in line j and $h_{i,j}(f)$ is the crosstalk power transfer function between lines j and i. Thus, the total downstream and upstream FEXT PSDs in line i can be calculated by adding the individual FEXT contributions from all other lines:

$$R_{DS\_FEXT,i}(f_d) = \sum_{j \neq i} R_{DS\_FEXT,i,j}(f_d) = \sum_{j \neq i} S_{DS,j}(f_d) \cdot |h_{i,j}(f_d)|^2 \quad (4)$$

$$R_{US\_FEXT,i}(f_u) = \sum_{j \neq i} R_{US\_FEXT,i,j}(f_u) = \sum_{j \neq i} S_{US,j}(f_u) \cdot |g_{i,j}(f_u)|^2$$

where $S_{DS,j}(f_d)$ and $S_{US,j}(f_u)$ respectively denote the down- and upstream transmit PSDs on line j, while $h_{i,j}(f_d)$, $g_{i,j}(f_u)$ are the down- and upstream FEXT couplings as defined in FIG. 2. The received NEXT PSDs may be written in a similar manner but are not shown here.

As seen from expression (1), QLN generally consists of FEXT, NEXT, and background noise. NEXT is usually much stronger than FEXT since it has travelled a much shorter distance in the line and is thus less attenuated, which makes it difficult to estimate FEXT in the presence of NEXT. However, since most DSL types use disjoint transmit and receive bands (also known as frequency division duplexing, FDD), receive band noise will typically be dominated by FEXT while transmit band noise will be dominated by NEXT. Thus, it is assumed that QLN(f) as measured in e.g. a DSLAM's receive bands contains negligible amounts of NEXT. Measuring QLN in such bands will thus typically yield the sum of FEXT and background noise.

Further, FEXT is commonly significantly stronger than the background noise, meaning that a QLN measurement in a receive band will give a good estimate of the total FEXT level as given in expression (4). Exceptions to this may occur, e.g. for very short lines and very long lines where background noise may dominate.

As previously indicated, the present apparatus uses near-end noise measurements to estimate far-end noise levels. A typical use would be the DSLAM in the apparatus 10 measuring upstream noise and using said noise to estimate downstream noise at the CPE side (at the far end $C_1$-2). For frequency bands where NEXT can be neglected, the aggregated (total) FEXT coupling from all other lines to line i, weighted by the transmit PSDs, can be estimated by dividing the total received noise power from expression (1) by the average transmit PSD and utilizing expression (4), such that:

$$\frac{R_{DS\_Noise,i}(f_d)}{\overline{S}_{DS}(f_d)} = \frac{\sum_{j \neq i} S_{DS,j}(f_d) \cdot |h_{i,j}(f_d)|^2 + R_{DS\_NEXT,i}(f_d) + N_{DS,i}(f_d)}{\frac{1}{n}\sum_{j \neq i} S_{DS,j}(f_d)} \quad (5)$$

$$\frac{R_{US\_Noise,i}(f_u)}{\overline{S}_{US}(f_u)} = \frac{\sum_{j \neq i} S_{US,j}(f_u) \cdot |g_{i,j}(f_u)|^2 + R_{US\_NEXT,i}(f_u) + N_{US,i}(f_u)}{\frac{1}{n}\sum_{j \neq i} S_{US,j}(f_u)}$$

The above expression can be rewritten as:

$$\frac{R_{DS\_Noise,i}(f_d)}{\overline{S}_{DS}(f_d)} = \frac{\sum_{j \neq i} S_{DS,j}(f_d) \cdot |h_{i,j}(f_d)|^2}{\frac{1}{n}\sum_{j \neq i} S_{DS,j}(f_d)} + \varepsilon_{DS}(f_d) = |H_i(f_d)|^2 + \varepsilon_{DS}(f_d) \quad (6)$$

$$\frac{R_{US\_Noise,i}(f_u)}{\overline{S}_{US}(f_u)} = \frac{\sum_{j \neq i} S_{US,j}(f_u) \cdot |g_{i,j}(f_u)|^2}{\frac{1}{n}\sum_{j \neq i} S_{US,j}(f_u)} + \varepsilon_{US}(f_u) = |G_i(f_u)|^2 + \varepsilon_{US}(f_u)$$

Where, $\overline{S}_{DS}(f)$ and $\overline{S}_{US}(f)$ are the average down- and upstream transmit PSDs, $|H_i(f)|^2$ and $|G_i(f)|^2$ are the aggregated FEXT power transfer functions in down- and upstream, $\varepsilon_{DS}(f)$ and $\varepsilon_{US}(f)$ are the estimation errors in down- and upstream caused by non-FEXT noise, and n is the number of active crosstalkers (neighbouring communications lines over which signals are transmitted). If FEXT is the dominating noise in the measured frequency bands, the estimation error will be small. It should be noted that individual transmit PSDs does not need to be known; knowing their average only is sufficient. A first approximation could be to use the maximum allowed PSD since it is common to operate DSL lines close to their maximum allowed limits.

As a special case, if the background noise is negligible and all lines use the same transmit PSDs (e.g. max allowed PSD), the aggregated FEXT coupling in expression (6) will reduce to $$|H_i(f_d)|^2 = \sum_{j \neq i} |h_{i,j}(f_d)|^2 \quad (7)$$

$$|G_i(f_u)|^2 = \sum_{j \neq i} |g_{i,j}(f_u)|^2.$$

The present apparatus may be based on an assumption of approximate crosstalk symmetry between downstream and upstream. This differs from some prior art where the downstream FEXT is estimated from NEXT, FEXT reciprocity, and FEXT model extrapolation respectively. A sufficient but not necessary condition for said symmetry is that $|h_{i,j}(f)| \approx |g_{i,j}(f)|$, $\forall j$ in FIG. 2. Even though deviations from the crosstalk symmetry may be present for individual pair-to-pair couplings, the aggregated crosstalk coupling may still fulfil the symmetry assumption with sufficient accuracy, i.e. that $|H_i(f)|^2 \approx |G_i(f)|^2$.

Thus, even though the apparatus 10 uses procedures and calculations regarding crosstalk coupling that may be similar to some prior art, the concept of the apparatus is fundamentally different since no CPE is needed at the far end $C_1$-2 of the present apparatus 10.

The crosstalk power transfer functions usually vary between different communication lines in a cable binder since the cables are not perfectly homogenous and symmetrical. It is often inevitable that for a multi-pair cable binder, some lines will be closer located to each other than other lines, thus leading to relatively higher crosstalk. It may therefore be difficult to define a model that describes the behaviour of each single crosstalk power transfer function in an accurate way. The most commonly used crosstalk models therefore describe the 1% worst case scenarios, which means that 99% of all lines should experience less crosstalk than what is predicted by the model. One example of such a crosstalk model is defined by the standardization sector of the International Telecommunication Union (ITU-T) with the purpose of providing a standardized set of testing procedures for DSL transceivers. The proposed model for the FEXT crosstalk power transfer function is described in ITU-T Recommendation G.996.1, "Test procedures for digital subscriber line (DSL) transceivers". Using that model with notation adapted to the convention in the present description for down- and upstream FEXT yields:

$$|H_i(f_d)|^2 = |h_{i,i}(f_d)|^2 \cdot k \cdot l \cdot p \cdot f_d^2$$

$$|G_i(f_u)|^2 = |g_{i,i}(f_u)|^2 \cdot k \cdot l \cdot p \cdot f_u^2 \quad (8)$$

where $|h_{i,i}(f_d)|^2$ and $|g_{i,i}(f_u)|^2$ are the down- and upstream direct channel transfer functions for line i, k is a coupling constant, l is the coupling path length (m), p is a meter-to-feet conversion constant ($1/0.3048 \approx 3.28$ ft/m), and $f_d$, $f_u$ are respectively the downstream and upstream frequencies (Hz). It should be noted that the coupling path experienced by line i can be shorter but not longer than the length of the line. If the disturbing lines are running along the victim line $C_i$ most of the way from the central office to the customer premises, the line length $L_i$ of the line $C_i$ can be used as an approximation for the coupling path length l. This approximation is used in the remaining part of this description.

The coupling constant k from the above expression has been determined by empirical studies (see in ITU-T Recommendation G.996.1) to be $k = 8 \cdot 10^{-20}(n/49)^{0.6}$ for the 1% worst FEXT case (99$^{th}$ percentile) in a 50-pair binder (i.e. cable with 50 lines) where n is the number of disturbers. In order to use the model for other binder sizes, it is convenient to replace n/49 with the a so called binder fill ratio, q, defined as $$q = \frac{n}{N-1}$$

where N is the number of communication lines in the binder. In this case, q could be any (rational) number between 0 and 1 representing the fraction of active crosstalk disturbers in the binder. However, it should be noted that since the original model was developed from measurements on a 50-pair binder, it is not necessarily valid for other binder sizes. Still, the model will work sufficiently well for common binder sizes where the described apparatus 10 may be utilized. The step-by-step example on how to estimate far-end FEXT described below shows measurement results where the model is validated with good results for a 10-pair binder.

In a typical DSL environment the noise will be dominated by crosstalk and, as mentioned earlier, since most DSL types utilize FDD, the noise measured at the near end $C_1$-1 of the line will commonly be dominated by FEXT from the far end of the neighbouring lines. Assuming that all disturbers are using the same DSL type (with compatible band plans) it is possible to estimate the FEXT power transfer function by rewriting expression (6) above into:

$$|H_i(f_d)|^2 = \frac{R_{DS\_Noise,i}(f_d)}{\overline{S}_{DS}(f_d)} - \varepsilon_{DS}(f_d) \qquad (9)$$

$$|G_i(f_u)|^2 = \frac{R_{US\_Noise,i}(f_u)}{\overline{S}_{US}(f_u)} - \varepsilon_{US}(f_u)$$

The SELT echo measurement can provide estimations of both the line length and the upstream transfer function $g_{i,i}(f_u)$ of the line and hence the only unknown in expression (8) is the coupling constant k. In this context, it is to be observed that SELT may measure the average of the upstream and downstream transfer functions but under the assumption of a reciprocal direct channel ($g_{i,i}(f) = h_{i,i}(f)$).

Rewriting the expression gives an expression for the estimated FEXT coupling constant from the upstream FEXT coupling:

$$\hat{k}_i = \frac{|G_i(f_u)|^2}{|g_{i,i}(f_u)|^2 \cdot L_i \cdot p \cdot f_u^2} \qquad (10)$$

where the line length $L_i$ has been used as an approximation for the coupling path length l. Together with expression (9), the estimated coupling constant for line i is then obtained as a function of the measured upstream noise PSD and other, presumably known, parameters:

$$\hat{k}_i = \frac{\frac{R_{US\_Noise,i}(f_u)}{\overline{S}_{US}(f_u)} - \varepsilon_{US}(f_u)}{|g_{i,i}(f_u)|^2 \cdot L_i \cdot p \cdot f_u^2} \qquad (11)$$

Now, if the error term $\varepsilon_{US}(f_u)$ is negligible or known a priori, the coupling coefficient may be calculated from expression (11) by e.g. setting $\varepsilon_{US}(f_u)$ to zero. If noise is only measured on a single frequency, calculation of $\hat{k}_i$ is straightforward. If noise is measured on multiple frequencies, $\hat{k}_i$ can be calculated e.g. by averaging the right hand of expression (11), either in linear or logarithmic (dB) scale. Averaging expression (11) in linear power scale and assuming that the error term is zero thus yields $$\hat{k}_i = \frac{1}{\|\Theta\|} \sum_{f_u \in \Theta} \frac{R_{US\_Noise,i}(f_u)}{\overline{S}_{US}(f_u) \cdot |g_{i,i}(f_u)|^2 \cdot L_i \cdot p \cdot f_u^2} \qquad (12)$$

Here, $f \in \Theta$ is the set of (upstream) frequencies where noise is measured and $\|\Theta\|$ denotes the size of the set (number of measured frequencies).

Since it may be assumed that the coupling path is equal for up- and downstream, it is actually not necessary to know the coupling length (or line length) if the coupling constant is modified so as to include the line length, $\hat{K}_i = \hat{k}_i L_i p$:

$$\hat{K}_i = \frac{1}{\|\Theta\|} \sum_{f_u \in \Theta} \frac{R_{US\_Noise,i}(f_u)}{\overline{S}_{US}(f_u) \cdot |g_{i,i}(f_u)|^2 \cdot f_u^2} \qquad (13)$$

A further option that may yield higher accuracy, especially if the received background noise or the NEXT noise are not negligible compared with the received FEXT levels, is to use common optimization techniques such as linear least-squares optimization (as found in most linear algebra textbooks) by minimizing the mean squared difference between the upstream noise measurement and the noise model. This minimization is performed over the set of frequencies $f_u \in \Phi$ where noise measurements are available. Such a least squares optimization problem can be employed for finding the coefficient vector x that minimizes the matrix norm of the difference between the measured upstream noise vector (denoted b) and the modelled upstream noise (matrix A times vector x), i.e. $\arg_x \min \|Ax - b\|$. Here the modelled upstream noise can include more components: e.g. both the upstream FEXT model and a model for the remaining part of the noise. Including a suitable model for the background noise can improve the accuracy of the FEXT coupling coefficient. One example of such a model is that $N_{US,i}(f_u)$ is assumed to be frequency independent and can be replaced by an unknown constant $N_0$. It is also possible to include a model for NEXT in order to improve FEXT estimation when non-negligible amounts of NEXT are present.

If matrix A is a square matrix with full rank, the problem is trivially solved as a linear equation system. Minimization of the matrix norm of Ax−b when A has more rows than columns can be solved using the commonly available methods for solving over-determined equation systems, e.g.

$$\underset{x}{\operatorname{argmin}} \left\| \underbrace{\left[ (|g_{i,i}(f_u)|^2 \cdot L_i \cdot p \cdot f_u^2 \cdot \overline{S}_{US}(f_u))^T \quad 1^T \right]}_{A} \cdot \underbrace{\begin{bmatrix} \hat{k}_i \\ N_0 \end{bmatrix}}_{x} - \right. \tag{14}$$

$$\left. \underbrace{[(R_{US\_Noise,i}(f_u))^T]}_{b} \right\| \Rightarrow$$

$$\Rightarrow \begin{bmatrix} \hat{k}_i \\ N_0 \end{bmatrix} = (A^T A)^{-1} A^T b$$

where $^T$ is the matrix transpose operator, "$^{-1}$" means matrix inverse, and A is a two-column matrix with as many rows as the number of upstream frequencies in the set Θ. The first column of A consists of the upstream FEXT model per frequency $f_u$ and the second column is a vector of ones ($1^T$).

In expression (14) above, upstream background noise is modelled as constant over frequency (hence the column of ones). However, other models such as a first order polynomial of $f_u$ or a model of NEXT may be included.

As shown above, the column vector b contains the measured upstream noise per frequency in the set Θ. The result of solving the above expression (14) is a vector with the sought FEXT coupling coefficient $\hat{k}_i$ and a coefficient $N_0$ describing the upstream background noise level.

Further, it is possible to modify expression (14) by omitting $L_i \cdot p$ from the first column of A. This would then yield the solution vector $$\begin{bmatrix} \hat{K}_i \\ \left( \dfrac{N_0}{L_i \cdot p} \right) \end{bmatrix}$$

containing another estimate of the modified coupling constant as in expression (13). This can be useful if the line length is not known, but if it is desired to estimate the background noise level, line length is still needed.

In many cases, it is expected that the averaging method in expressions (12) or (13) can estimate the FEXT coupling coefficient with sufficient accuracy and thus it may not be necessary to use the more computationally complex optimization method of expression (14).

With the knowledge of $\hat{K}_i$ (or $\hat{k}_i$), it is now possible to apply the FEXT model from expression (8) in the opposite direction (downstream) compared with measurements (upstream) and to combine this with expression (4) in order to get an estimate of the far-end FEXT:

$$\hat{R}_{DS\_FEXT,i}(f_d) = \overline{S}_{DS}(f_d) \cdot |h_{i,i}(f_d)|^2 \cdot \hat{K}_i \cdot f_d^2 \tag{15}$$

where the modified coupling constant has been used and which includes the line length $L_i$. Since the coupling path length is expected to be similar for both up- and downstream, any errors caused by this assumption when estimating the coupling coefficient will in most cases be cancelled when calculating the downstream FEXT.

For FEXT-dominated lines, the far-end FEXT from expression (15) can be used directly as the total far-end noise level. However, the resulting far-end noise level may be too low in certain cases unless also the background noise level is taken into account. The total far-end noise (excluding any NEXT) would then be the sum of FEXT and background noise where the background noise is e.g. a priori known (or based on an assumption):

$$\hat{R}_{DS\_Noise,i}(f_d) = \hat{R}_{DS\_FEXT,i}(f_d) + \hat{N}_{DS,i}(f_d) \tag{16}$$

A common assumption for DSL is that the background noise of a CPE is −140 dBm/Hz, even though the background noise in practice may vary. Using expression (15) facilitates that estimated far-end noise levels will not go below the assumed CPE background noise level $\hat{N}_{DS,i}(f_d)$. A similar effect, although less correct, can be reached by using the maximum of the dB values of the estimated FEXT and background noise levels.

Finally, it is possible to add a configurable margin to the estimated far-end noise level (in dB scale). This margin could be used to compensate for measurement errors and estimation errors, thus decreasing the probability that the noise estimate would be too optimistic (i.e. lower than the actual noise level).

If the coupling coefficient is constant over all measured frequencies (ideal FEXT-dominated case), the above steps can be simplified, omitting the model identification and combining expressions (9), (10), and (14) which yields:

$$\hat{R}_{DS\_FEXT,i}(f_d) = R_{US\_Noise,i}(f_u) \frac{\overline{S}_{DS}(f_d)}{\overline{S}_{US}(f_u)} \cdot \frac{|h_{i,i}(f_d)|^2}{|g_{i,i}(f_u)|^2} \cdot \left( \frac{f_d}{f_u} \right)^2 \tag{17}$$

where, as mentioned, $f_u$ is the frequency in an upstream band and $f_d$ is the frequency in a downstream band. In practice, the coupling coefficient is not completely constant over frequency, which means that the above expression (17) can not be directly applied to handle the case when more than one upstream frequency is measured on. Instead, an alternative method to the model identification described earlier could be to take the average of expression (17) for the set of all measured upstream frequencies, $f_u \in \Theta$, in order to estimate the far-end FEXT level for each downstream frequency of interest:

$$\hat{R}_{DS\_FEXT,i}(f_d) = \frac{1}{\|\Theta\|} \sum_{f_u \in \Theta} R_{US\_Noise,i}(f_u) \frac{\overline{S}_{DS}(f_d)}{\overline{S}_{US}(f_u)} \cdot \frac{|h_{i,i}(f_d)|^2}{|g_{i,i}(f_u)|^2} \cdot \left( \frac{f_d}{f_u} \right)^2 \tag{18}$$

where $\|\Theta\|$ denotes the number of measured upstream frequencies (size of the set Θ). The above expression (18) is straightforward but has a tendency to put more weight on noise measured at low frequencies where FEXT levels are low and possibly less reliable, which may lead to a slightly reduced accuracy in comparison with the model identification method described earlier and given by expressions (14), (15). In brief, the expression (18) uses a number of measured upstream noise values for determining an average far-end crosstalk value.

Thus, the model identification approach in expressions (14), (15) may be preferred if higher accuracy is needed.

A step-by-step example regarding using one embodiment of the apparatus 10 to calculate far-end noise from a near-end noise measurement can in brief include the following:

i) On the selected line, which is exemplified by line $C_1$, measure received noise in the DSL transceiver for at least one receive band frequency that is not dominated by NEXT.

ii) Estimate the direct channel power transfer function (phase is not needed) for all frequencies of interest, i.e. the upstream transfer function for frequencies where noise is measured and the downstream transfer function for frequencies where far-end noise should be calculated.

iii) Estimate the modified FEXT coupling coefficient $\hat{K}_i$ from the noise, using e.g. expression (13) and knowledge about the average upstream transmit PSDs (e.g. assuming max allowed PSD).

iv) Calculate an estimate of the far-end noise, $QLN_{DS,i}(f)$, from expressions (15) and (16) using $\hat{K}_i$, knowledge about the average downstream transmit PSDs (e.g. assuming max allowed PSD), and any a priori information about background noise levels at the far-end receiver.

v) If desired, add a suitable margin such as 2 dB to the estimated noise in order to increase the probability that the estimated noise is not lower than the actual noise since this would result in optimistic capacity estimates.

Another step-by-step example on how to estimate far-end FEXT on frequency $f_d$ using near-end FEXT measurements on frequency $f_u$ using the expression (17) can include the following:

i) On the selected line, measure received noise in the DSL transceiver for at least one receive band frequency $f_u$ that is not dominated by NEXT.

ii) Estimate the ratio of the direct channel power transfer functions between $f_d$ and $$f_u, \frac{|h_{i,i}(f_d)|^2}{|g_{i,i}(f_u)|^2}$$

e.g. using SELT or some a priori knowledge regarding the used cables.

iii) Estimate the ratio between the average downstream transmit PSD at $f_d$ and the average upstream transmit PSD at $$f_u, \frac{\overline{S}_{DS}(f_d)}{\overline{S}_{US}(f_u)}$$

iv) Estimate the far-end FEXT using (17) and the information in the previous steps. If multiple upstream frequencies were measured, expression (18) is used instead of expression (17).

v) If desired, add a suitable margin to the estimated noise in order to increase the probability that the estimated noise is not lower than the actual noise since this would result in optimistic capacity estimates.

As indicated above, the FEXT model utilized in the present apparatus has been determined empirically from measurements on a 50-pair binder. To verify the accuracy of the model for other binder sizes and hence justifying the introduction of the binder fill ratio q, a series of measurements were performed on a 500 m 10-pair cable with a gauge of 0.4 mm. A network analyzer was used to measure the direct channels and all of the FEXT transfer functions, i.e. $g_{i,j}(f_u)$ and $h_{i,j}(f_d)$ with i=1 . . . 10 and j=1 . . . 10 using the notation in FIG. 2. The aggregated crosstalk couplings into line 1 were then calculated for both transmission directions using expression (7), $$|H_1(f_d)|^2 = \sum_{j=2}^{10} |h_{1,j}(f_d)|^2,$$

$$|G_1(f_u)|^2 = \sum_{j=2}^{10} |g_{1,j}(f_u)|^2.$$

Figure 3:
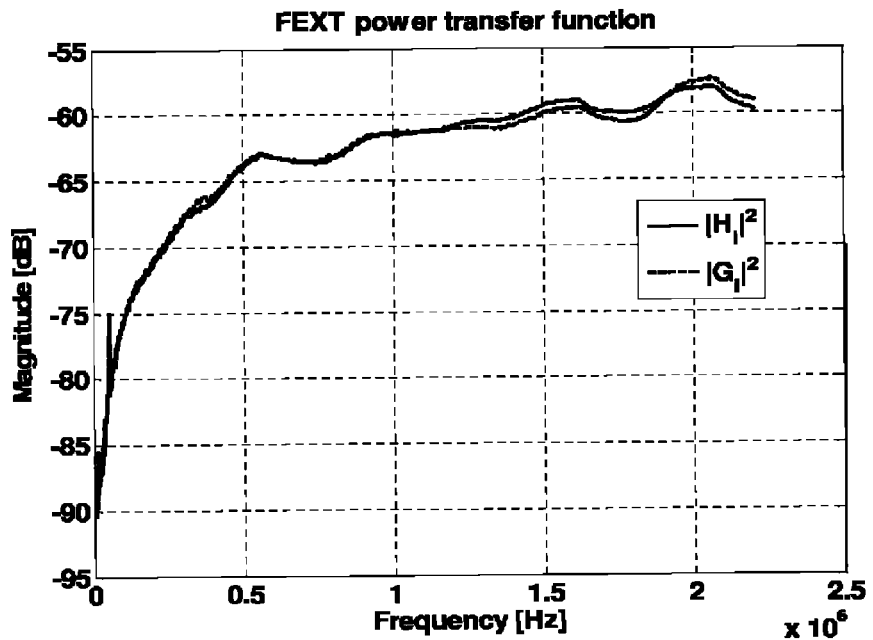
FIG. 3 is a diagram illustrating a small difference between a downstream power transfer function $|H_1(f)|^2$ and an upstream power transfer function $|G_1(f)|^2$, indicating nearly perfect crosstalk symmetry.

As stated earlier, one requirement for the described apparatus to work is approximate crosstalk symmetry i.e. $|H_i(f)|^2 \approx |G_i(f)|^2$. Note that only the magnitude of the aggregated crosstalk power transfer function is relevant for the apparatus. The measured values for $|H_i(f)|^2$ and $|G_i(f)|_2$ are shown in FIG. 3 and as can be seen, the difference between them is small for the measured frequency range and hence the assumption of crosstalk symmetry is valid in the tested case.

Figure 4:
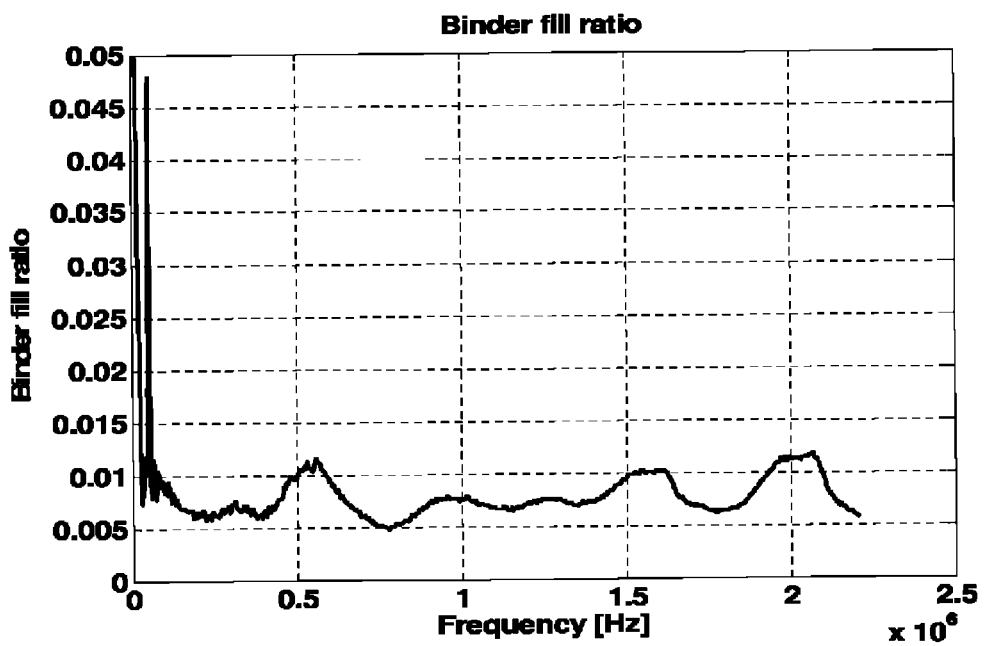
FIG. 4 is a diagram illustrating binder fill ratio calculated from an estimate of upstream FEXT coupling.

Using the measured value of $|H_1(f)|^2$, the direct channel $|h_{1,1}(f)|^2$, and the known line length $L_1$, it is possible to calculate the estimated coupling constant $\hat{k}_1$ in expression (12) and then also the estimated binder fill ratio $\hat{q}_1$. If the model in expression (8) would be a good representation of the real FEXT crosstalk, the estimated value of q should be constant with frequency. As can be seen in FIG. 4 there are some variations in the estimated binder fill ratio but except for the disturbance at low frequencies it is fairly constant and thus the model gives a good approximation of the frequency behaviour of the noise. FIG. 4 also shows, as expected, that the estimated value of the binder fill ratio is much lower than the actual binder fill ratio (=1.0) since the model represents the 1% worst case crosstalk while the measured cable has lower FEXT. The absolute value of the binder fill is however not an issue for applications such as capacity estimation, since it is the actual FEXT level and not the worst case level that is of interest. Of course, the worst case FEXT level could be used as a pessimistic capacity estimate but such an estimate would in many cases prevent an operator from selling a perfectly feasible service to a subscriber.

To validate the accuracy and practical usability of the apparatus 10, the proposed methods were also validated in a scenario with DSL equipment. Once again a 10-pair cable was used but this time it was a 1.5 km, gauge 0.4 mm cable. Two experiments were performed, one with 9 disturbing crosstalkers and one with 5 disturbing crosstalkers. Line 1 was selected as a victim line (i.e. the line for which FEXT shall be estimated) and therefore a DSLAM was connected at the near end of this line while the far end had an open termination. All other lines were used to generate crosstalk and had a DSLAM connected at the near ends and CPEs connected at the far ends. All lines were running the ADSL standard according to ITU-T Recommendation G.992.5, "Asymmetric Digital Subscriber Line (ADSL) transceivers—Extended bandwidth ADSL2 (ADSL2+)".

Following the first step by step example above, a SELT test was first invoked on line 1. Although the DSLAM was capable of measuring noise PSD values from approximately 9 kHz-276 kHz, the upstream QLN-results were deliberately limited to frequencies between 50 kHz and 120 kHz in order to avoid measurement errors due to receiver filter edges and NEXT. At those frequencies the measured noise should be dominated by FEXT from the far end to the near end. As mentioned before, an echo measurement is also performed during the SELT test and this will give an estimation of both the line length L and the direct channel transfer function. All the variables in expression (13) is hence known and it is straightforward to calculate the modified coupling constant $\hat{K}$. With the assumption of crosstalk symmetry, $\hat{K}$ should be equal for downstream and upstream and it is thus possible to estimate the far end FEXT in the downstream direction by using expression (15). This result, together with the assumption of −140 dBm/Hz background noise at the far end was used in expression (16) to get the total far-end noise estimate.

Figure 5:
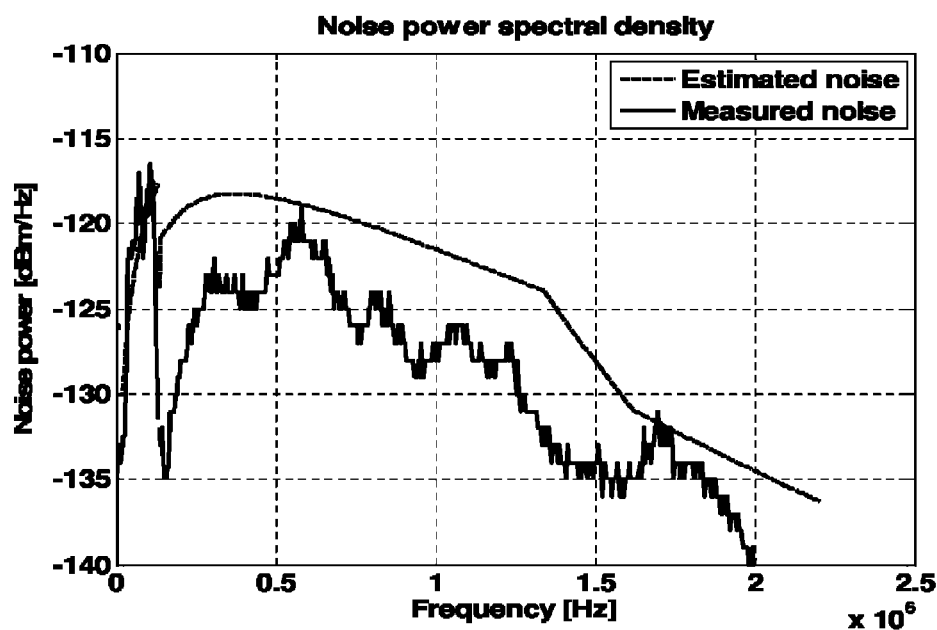
FIG. 5 is a diagram illustrating estimated and measured noise with 5 active crosstalkers.
Figure 6:
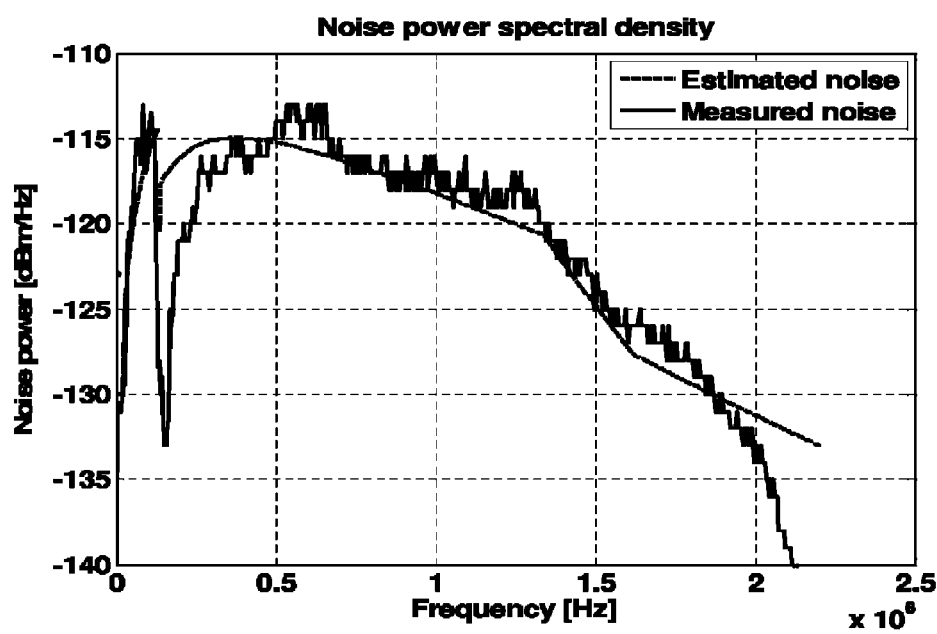
FIG. 6 is a diagram illustrating estimated and measured noise with 9 active crosstalkers.

To be able to compare the estimated far-end noise with the actual value, a CPE was connected to the far end of pair 1. A Double Ended Line Test (DELT) was then used to measure the QLN at both ends of the cable. The DELT results and the estimated values of the noise are shown in the same graph in FIG. 5 and FIG. 6 for the two different experiments, where FIG. 5 illustrates the result when 5 crosstalkers are active, and FIG. 6 illustrates the result when 9 crosstalkers are active. As can be seen, the estimation is very accurate when all 9 crosstalkers are active, while it is a bit too high for the case of 5 crosstalkers. This behaviour can however be expected since single crosstalk couplings have a high variation and the used model was developed from studies of the sum of many crosstalkers where the variance will decrease (law of large numbers). In a typical DSL environment it is also not common to have as few as only five disturbers (crosstalkers).

From the description above it follows that the apparatus 10 implements a method for estimating far-end crosstalk $\hat{R}_{DS\_FEXT,i}(f_d)$ for the end $C_1$-2 of the communication line $C_1$ ($C_i$) furthest from a transceiver 10-1 to which the communication line $C_1$ is connected.

Figures 7, 9:
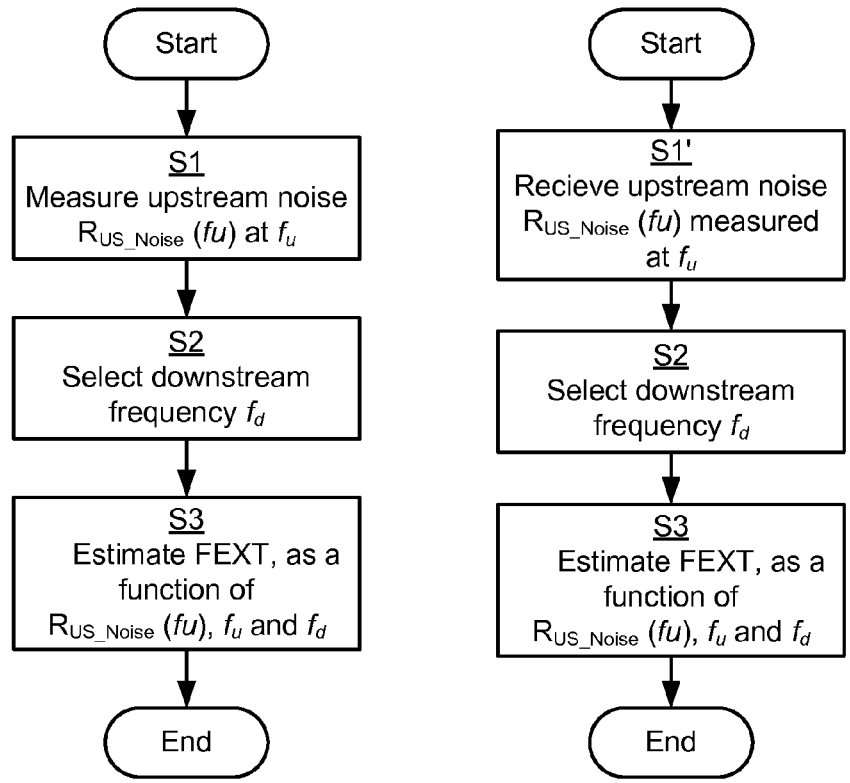
FIG. 7 is a flow diagram illustrating an embodiment of a method for estimating far-end crosstalk, performed by the apparatus of FIG. 1.
FIG. 9 is a flow diagram illustrating an embodiment of a method for estimating far-end crosstalk, performed by the system of FIG. 8.

With reference to FIG. 7, the most general form of the method includes a number of steps S1-S3, where the first step S1 comprises measuring upstream noise $R_{US\_Noise,i}(f_u)$ at an upstream frequency $f_u$, the upstream noise $R_{US\_Noise,i}(f_u)$ being induced in the communication line $C_1$ due to the crosstalk from neighbouring communication lines.

In a next step S2 a downstream frequency $f_d$ is selected for which the far-end crosstalk $\hat{R}_{DS\_FEXT,i}(f_d)$ is to be determined. The downstream frequency $f_d$ is typically selected from a set of available frequencies that may be used for downstream communication with a CPE, where available frequencies are specified by standards within the field of data communication or specified by an operator (based on regulatory limitations) that will deliver a downstream service to a CPE.

In the final step S3, the far-end crosstalk $\hat{R}_{DS\_FEXT,i}(f_d)$ is estimated as a function of the upstream noise $R_{US\_Noise,i}(f_u)$ the upstream frequency $f_u$ and the downstream frequency $f_d$. More particularly, the upstream noise $R_{US\_Noise,i}(f_u)$ can be is determined as a function of the upstream frequency $f_u$ while the upstream frequency $f_u$ can be selected form a set of available frequency values, in a manner similar with the selection of the downstream frequency $f_d$. In its most simple form, the far-end crosstalk $\hat{R}_{DS\_FEXT,i}(f_d)$ is determining by multiplying the upstream noise $R_{US\_Noise,i}(f_u)$ with the quotient of the downstream frequency $f_d$ and the upstream frequency $f_u$.

Software instructions, i.e. a computer program code for carrying out embodiments of the described method may for development convenience be written in a high-level programming language such as Java, C, and/or C++ but also in other programming languages, such as, but not limited to, interpreted languages. The software instructions can also be written in assembly language or even micro-code to enhance performance and/or memory usage. It will be further appreciated that the functionality of any or all of the functional steps performed by the apparatus may also be implemented using discrete hardware components, one or more application specific integrated circuits, or a programmed digital signal processor or microcontroller. Accordingly, the computer-readable medium 18 can store processing (software) instructions that, when executed by e.g. the processor unit 14, performs the method implemented in the apparatus 10.

Also, operations of the apparatus may be performed in a different order than described, may be combined and may be divided into sub-operations. Furthermore, additional operations may be performed by the processor unit and certain operations can be performed only when a certain accuracy is needed.

Figure 8:
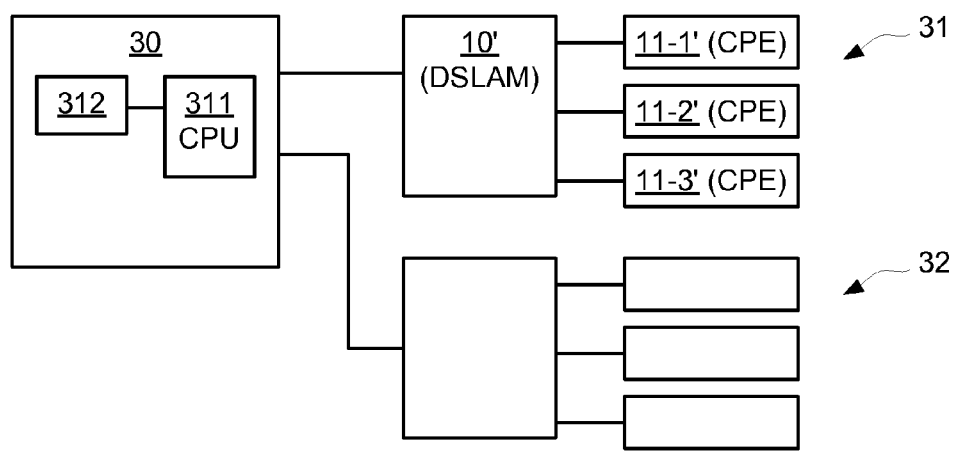
FIG. 8 illustrates an embodiment of a system implementing the invention and arranged for managing a number of access nodes.

Moreover, with reference to FIG. 8, the invention may be implemented as a system 30 which can manage sets of DSLAM units and CPEs, such as set 31 and set 32. The sets can be similar and can each comprise a standard DSLAM unit 10' to which a number of conventional CPEs 11-1', 11-2', 11-3' are connected.

The system 30 can be implemented as an O&M (operations and management) device which typically has the form of a workstation or similar computer. The system 30 has a processing unit 311 and a memory unit 312 which stores processing instructions that, when executed by the processor unit 311, performs a method of estimating far-end crosstalk for one of the DSLAM units and a related CPE.

In this case the method performed by the system 30 corresponds to the method described above, with the difference that the measured noise is received by the system 30 after the relevant DSLAM has performed the measurement, as can be seen in FIG. 9 where the method is schematically illustrated.

In practice, the invention may be implemented in e.g. already existing DSLAM units and O&M systems without requiring any introduction of new hardware components, as long as the relevant processing unit of the DSLAM/O&M system is configured to perform the described method. Moreover, the invention may also be implemented in a CPE, which would correspond to an implementation as described above but with the difference of changing "downstream" to "upstream" and vice versa, such that the apparatus is the CPE which would then allow an end-user to estimate FEXT as experienced by the DSLAM.

Although various embodiments of the invention have been described and shown, the invention is not restricted thereto, but may also be embodied in other ways within the scope of the subject-matter defined by the above described apparatus, system and methods.

The invention claimed is:

1. An apparatus for estimating far-end crosstalk for an end of a communication line furthest from a transceiver to which the communication line is connected, the apparatus configured to:
    measure upstream noise at an upstream frequency, the upstream noise induced in the communication line due to the crosstalk;
    select a downstream frequency for which the far-end crosstalk is to be determined; and
    estimate the far-end crosstalk without using far-end noise measurements as a function of the upstream noise, the upstream frequency, and the downstream frequency.

2. The apparatus of claim 1, further configured to:
    determine a first relationship on basis of an upstream power spectral density and a downstream power spectral density, as a function of the upstream frequency and the downstream frequency; and
    estimate the far-end crosstalk as a function of the first relationship.

3. The apparatus of claim 2, further configured to determine the first relationship on basis of a quotient of the downstream power spectral density and the upstream power spectral density.

4. The apparatus of claim 2, further configured to determine the upstream power spectral density as a function of a set of upstream power spectral density-values used for upstream signal transmission over communication lines adjacent to the communication line.

5. The apparatus of claim 2, further configured to determine the downstream power spectral density as a function of a set of downstream power spectral density-values used for downstream signal transmission over communication lines adjacent to the communication line.

6. The apparatus of claim 2, further configured to determine each of the upstream power spectral density and the downstream power spectral density as a function of a respective predetermined spectral density-value.

7. The apparatus of claim 1, further configured to:
determine a second relationship on basis of an upstream power transfer function and a downstream power transfer function of the communication line, as a function of the upstream frequency and the downstream frequency; and
estimate the far-end crosstalk as a function of the second relationship.

8. The apparatus of claim 7, further configured to determine the second relationship on basis of a quotient of the downstream power transfer function and the upstream power transfer function.

9. The apparatus of claim 7, further configured to execute a single-ended line test for determining each of the upstream power transfer function and the downstream power transfer function.

10. The apparatus of claim 7, further configured to determine each of the upstream power transfer function and the downstream power transfer function on basis of known properties of the communication line.

11. The apparatus of claim 1, further configured to select the upstream frequency as a function of at least one frequency-value used for downstream signal transmission over at least one communication line adjacent the communication line.

12. The apparatus of claim 1, further configured to estimate a number of far-end crosstalk values on basis of upstream noise in the communication line measured for a set of different upstream frequency values.

13. The apparatus of claim 12, further configured to determine an average far-end crosstalk value, as a function of the number of measured upstream noise values.

14. The apparatus of claim 1, further configured to determine a far-end noise level, as a function of the estimated far-end crosstalk and a predetermined background noise-level.

15. The apparatus of claim 1, wherein the end of the communication line furthest from the transceiver is not connected to any customer premises equipment that communicates with the apparatus for estimating the far-end crosstalk.

16. The apparatus of claim 1, further configured to measure upstream noise by executing a quiet line noise measurement in the communication line.

17. An apparatus for estimating far-end crosstalk for an end of a communication line furthest from a transceiver to which the communication line is connected, the apparatus configured to:
measure downstream noise at a downstream frequency, the downstream noise induced in the communication line due to the crosstalk;
select an upstream frequency for which the far-end crosstalk is to be determined; and
estimate the far-end crosstalk without using far-end noise measurements as a function of the downstream noise, the downstream frequency, and the upstream frequency.

18. A system for estimating far-end crosstalk for an end of a communication line furthest from a transceiver to which the communication line is connected, wherein the system:
receives upstream noise measured at an upstream frequency, the upstream noise induced in the communication line due to the crosstalk;
selects a downstream frequency for which the far-end crosstalk is to be determined; and
estimates the far-end crosstalk without using far-end noise measurements as a function of the upstream noise, the upstream frequency, and the downstream frequency.

19. A method of estimating far-end crosstalk for an end of a communication line furthest from a transceiver to which the communication line is connected, the method comprising the steps of:
measuring upstream noise at an upstream frequency, the upstream noise induced in the communication line due to the crosstalk;
selecting a downstream frequency for which the far-end crosstalk is to be determined; and
estimating the far-end crosstalk without using far-end noise measurements as a function of the upstream noise, the upstream frequency, and the downstream frequency.

20. A method of estimating far-end crosstalk for an end of a communication line furthest from a transceiver to which the communication line is connected, the method comprising the steps of:
measuring downstream noise at a downstream frequency, the downstream noise induced in the communication line due to the crosstalk;
selecting an upstream frequency for which the far-end crosstalk is to be determined; and
estimating the far-end crosstalk without using far-end noise measurements as a function of the downstream noise, the downstream frequency, and the upstream frequency.

21. A method of estimating far-end crosstalk for an end of a communication line furthest from a transceiver to which the communication line is connected, the method comprising the steps of:
receiving upstream noise measured at an upstream frequency, the upstream noise induced in the communication line due to the crosstalk;
selecting a downstream frequency for which the far-end crosstalk is to be determined; and
estimating the far-end crosstalk without using far-end noise measurements as a function of the upstream noise, the upstream frequency, and the downstream frequency.

* * * * *

UNITED STATES PATENT AND TRADEMARK OFFICE
CERTIFICATE OF CORRECTION

PATENT NO. : 8,731,185 B2
APPLICATION NO. : 13/505285
DATED : May 20, 2014
INVENTOR(S) : Berg et al.

It is certified that error appears in the above-identified patent and that said Letters Patent is hereby corrected as shown below:

In the Specification

Column 9, Line 11, delete "CP Es 11-1," and insert -- CPEs 11-1, --, therefor.

Column 13, Line 7, delete "the a" and insert -- a --, therefor.

Column 18, Line 40, delete "CP Es" and insert -- CPEs --, therefor.

Signed and Sealed this
Eleventh Day of November, 2014

Michelle K. Lee
*Deputy Director of the United States Patent and Trademark Office*